US005796465A

United States Patent [19]

Arimoto et al.

[11] Patent Number: 5,796,465

[45] Date of Patent: Aug. 18, 1998

[54] AUTOMATIC FILM DEVELOPMENT APPARATUS

[75] Inventors: Keigo Arimoto; Masayuki Kojima; Takuya Yamamoto; Hisashi Negoro, all of Wakayama, Japan

[73] Assignee: Noritsu Koki Co., Ltd., Wakayama, Japan

[21] Appl. No.: 718,948

[22] Filed: Sep. 24, 1996

[30] Foreign Application Priority Data

Oct. 5, 1995 [JP] Japan .................................... 7-258766

[51] Int. Cl.[6] ........................... G03B 27/32; G03B 27/52; G03B 29/00

[52] U.S. Cl. ................................ 355/27; 355/28; 355/29; 396/612; 396/613; 396/622

[58] Field of Search ................................ 355/27, 26, 28, 355/29; 396/613, 620, 612, 617, 622

[56] References Cited

U.S. PATENT DOCUMENTS

| | | | |
|---|---|---|---|
| 3,517,896 | 6/1970 | Kral . | |
| 3,526,406 | 9/1970 | Blackie et al. . | |
| 3,667,835 | 6/1972 | Nupnau . | |
| 3,674,347 | 7/1972 | Iha . | |
| 3,690,751 | 9/1972 | von Fischern et al. . | |
| 3,753,486 | 8/1973 | Vogt et al. . | |
| 4,221,479 | 9/1980 | Harvey . | |
| 4,910,546 | 3/1990 | Nonaka et al. | 354/299 |
| 5,032,854 | 7/1991 | Smart et al. . | |
| 5,210,561 | 5/1993 | Nakai et al. | 354/297 |
| 5,296,887 | 3/1994 | Zander . | |
| 5,463,441 | 10/1995 | Yamaguchi | 354/321 |
| 5,475,463 | 12/1995 | Yamaguchi et al. | 354/321 |
| 5,561,489 | 10/1996 | Yamaguchi et al. | 396/567 |
| 5,565,953 | 10/1996 | Fukushima et al. | 396/620 |
| 5,576,794 | 11/1996 | DeMarti, Jr. et al. | 396/654 |

FOREIGN PATENT DOCUMENTS

| | | |
|---|---|---|
| 0 421 493 | 4/1991 | European Pat. Off. . |
| 0 623 851 | 12/1994 | European Pat. Off. . |
| 0 629 916 | 12/1994 | European Pat. Off. . |
| 0 675 408 A2 | 4/1995 | European Pat. Off. . |
| 62-286048 | 12/1987 | Japan . |
| 7-281386 | 10/1995 | Japan . |

OTHER PUBLICATIONS

U.S. Patent Application Serial No. 08/711,881, filed Sep. 12, 1996, entitled "Film Cartridge Case", located in Group Art Unit 3503 by Keigo Arimoto et al.

*Primary Examiner*—R. L. Moses
*Assistant Examiner*—Shival Virmani
*Attorney, Agent, or Firm*—Wenderoth, Lind & Ponack, L.L.P.

[57] ABSTRACT

An automatic film development apparatus includes a cartridge case for carrying a group of film cartridges loaded with undeveloped films. A feeder unit stores a plurality of the cartridge cases and delivering them one by one to an unloading station for unloading sheets of undeveloped film from respective film cartridges in the cartridge case. The undeveloped film sheet is rewound at a rewinding station into a takeup cartridge. A splicer unit joins one end of the undeveloped film sheet from the takeup cartridge to a short film leader supplied from a film leader supply unit for feeding short film leaders one at the time. A development unit developes the undeveloped film sheet joined to the short film leader. A separator unit separates a developed film sheet from the short film leader. The developed film sheet separated from the short film leader is loaded at a loading station back into its film cartridge. A conveying means conveys the cartridge case filled with film cartridges unloaded of film from the unloading station to the loading station. A leader receiver unit collects short film leaders separated from respective developed film sheets.

15 Claims, 8 Drawing Sheets

AUTOMATIC FILM DEVELOPMENT APPARATUS

BACKGROUND OF THE INVENTION

The present invention relates to a photographic film development apparatus and more specifically, to an automatic film development apparatus in which sheets of undeveloped film are unloaded from respective film cartridges installed in a single cartridge magazine or case.

In a conventional automatic film development apparatus, the development process including complex steps is automatically carried out but both pre- and post-development processes have to be performed manually.

More specifically, the pre-development process includes manually unloading a sheet of undeveloped film from its cartridge, joining it with a short film leader by a strip of adhesive tape, and setting them on the conventional automatic film development apparatus. The post-development process involves manually separating each developed film sheet into segments, each carrying 4 to 6 frames, and installing them into a negative film pouch sheet.

Therefore, such manual processes in the conventional automatic film development apparatus will decrease operational efficiency.

For compensation of such problem, a film cartridge of a new type, shown in FIG. 2, has been proposed which is capable of being handled automatically for improving the known development process.

The film cartridge 3 comprises a casing 15 composed of two synthetic resin sections, a spool 16 rotatably mounted in the casing 15, and a cover 18 for closing a film outlet 17 to shield the interior of casing 15 from external light.

The cover 18 is actuated for opening and closing operations by a pivotal (operating) shaft 19 which is mounted through a side wall of the casing 15 to be driven with an opening and closing mechanism (not shown). When the cover 18 is opened, the spool 16 is rotated with one (operating) end 20 engaged across the side wall of the casing 15 and driven by a rotating mechanism (not shown) for loading and unloading the film 5. The casing 15 of cartridge 3 has an ID bearing region 23 on the outer surface thereof for indicating an identification number of the cartridge 3.

The present invention is directed towards an automated photographic film development apparatus and includes a system in which a sheet of undeveloped film is unloaded from its film cartridge and after development is loaded again into its cartridge automatically, thus saving energy and increasing operational efficiency.

SUMMARY OF THE INVENTION

An automatic film development apparatus according to the present invention comprises a cartridge case for carrying a group of film cartridges loaded with undeveloped films, a feeder unit for storing a plurality of the cartridge cases and delivering them one by one, an unloading station for unloading a sheet of undeveloped film from its film cartridge in the cartridge case, a rewinding station for rewinding the undeveloped film sheet into a takeup cartridge, a splicer unit for joining one end of the undeveloped film sheet from the takeup cartridge with a short film leader for guiding the film sheet, a film leader supply unit for feeding short film leaders one at a time, a development unit for developing the undeveloped film sheet joined with the short film leader, a separator unit for separating the thus developed film sheet from the short film leader, a loading station for loading the developed film sheet separated from the short film leader back into its film cartridge, a conveying means for conveying the cartridge case filled with the film unloaded cartridges from the unloading station to the loading station, and a leader receiver unit for collecting the short film leaders separated from the developed film sheets.

Preferably, the short film leader is joined at the splicer unit with two of the undeveloped film sheets. Also, the cartridge case has holddown means for holding the film cartridges in respective cartridge containers, through apertures for passing the film sheets for unloading and loading, and positioning elements provided on one side thereof.

DETAILED DESCRIPTION OF THE PREFERRED EMBODIMENT

A cartridge case carrying therein a group of film cartridges loaded with undeveloped films is placed in an unloading station for unloading sheets of undeveloped film from their respective cartridges.

When the undeveloped film sheets have been drawn out from their respective cartridges, they are rewound in takeup cartridges.

The exposed end of each undeveloped film sheet in the takeup cartridge is joined by a joiner system with a short film leader which guides the undeveloped film sheet throughout the steps of development so that the undeveloped film sheet can readily be developed with accuracy and with less damage thereto.

The undeveloped film sheets headed with their respective short leaders are subjected to a common development process in a developer unit.

The film sheets thus developed are then loaded back into their respective film cartridges.

The automatic film development apparatus according to the present invention will be described in more detail referring to the accompanying drawings.

Figure 1:
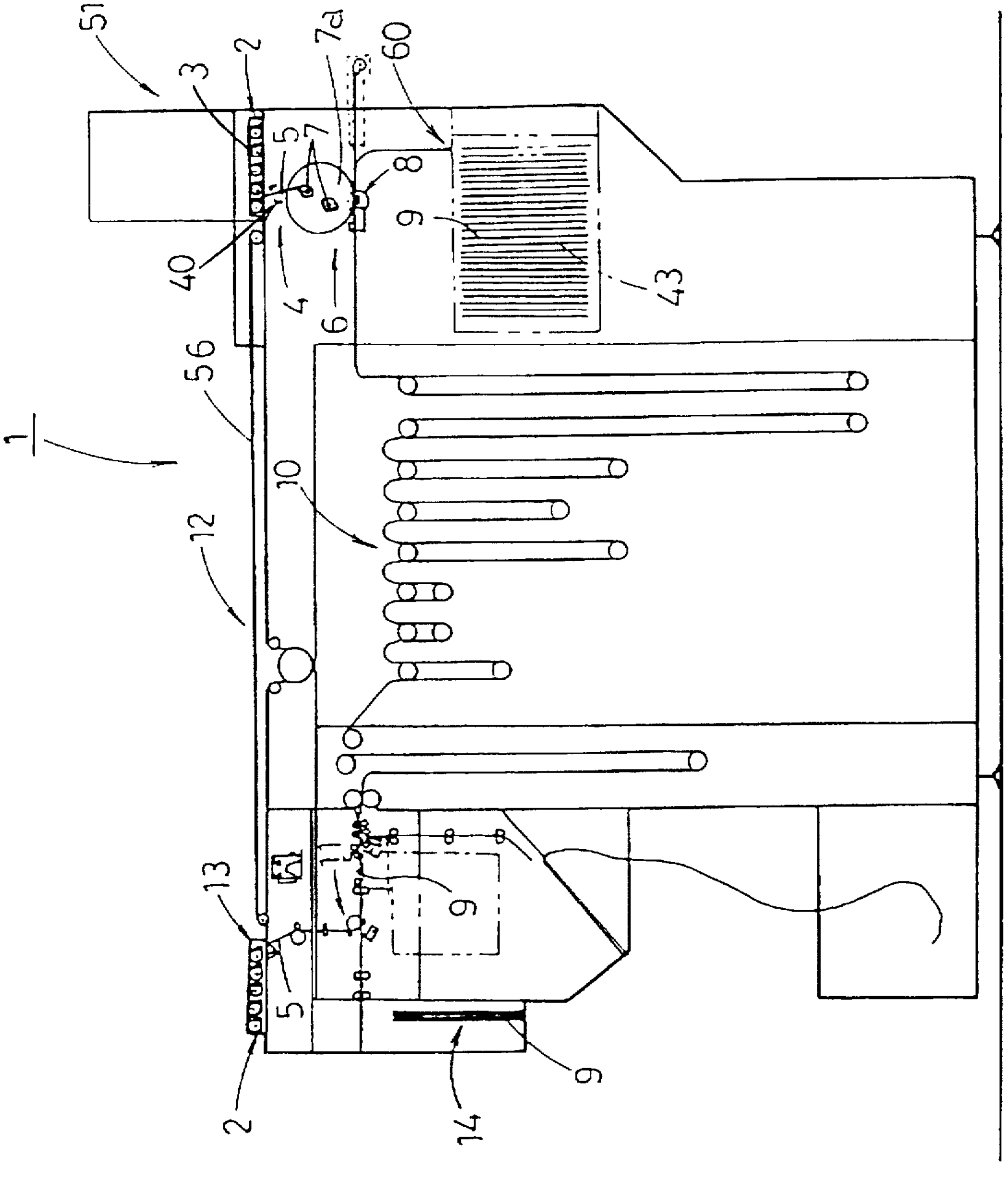
FIG. 1 is a schematic side of an automatic film development apparatus according to the present invention.

FIG. 1 is a partial cross sectional side view of the entire arrangement, denoted by 1, of the automatic film development apparatus. Also shown are a cartridge case 2 for carrying therein a number of film cartridges 3 loaded with undeveloped film and which is located in a film feeder system 40, an unloading station 4 where a sheet of undeveloped film 5 is drawn out from its cartridge 3 in the cartridge case 2, and a rewinding station 6 where the undeveloped film sheet 5 is rewound into a takeup cartridge 7 installed in an upside-down magazine *7a*. There are provided a splicer unit 8 for joining the exposed end of the undeveloped film sheet 5 from the takeup cartridge 7 with a short film leader 9 supplied one by one from a leader feeder system 60 for further transfer, a developer unit 10 for developing the undeveloped film sheet 5 accompanied with the short leader 9, a separator unit 11 for separating the developed film sheet 5 from the short leader 9, an unloaded film cartridge case conveying means 12 for conveying the unloaded film cartridges 3 from which the undeveloped film sheet 5 has been unloaded at the unloading station 4 of the film feeder 40, a loading station 13 where a developed film sheet 5 is loaded into the unloaded film cartridge 3, and a leader receiver unit 14 for storing a group of the short leaders 9 separated from their respective developed film sheets 5 at the separator unit 11.

Figure 2:
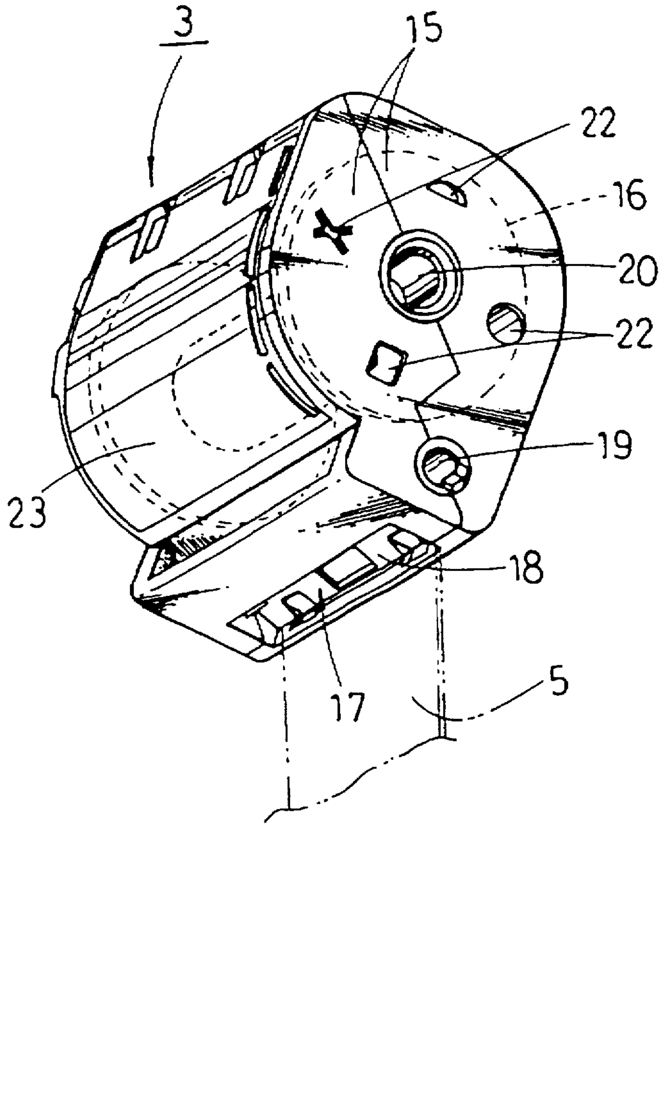
FIG. 2 is a perspective view of a film cartridge.
Figure 3:
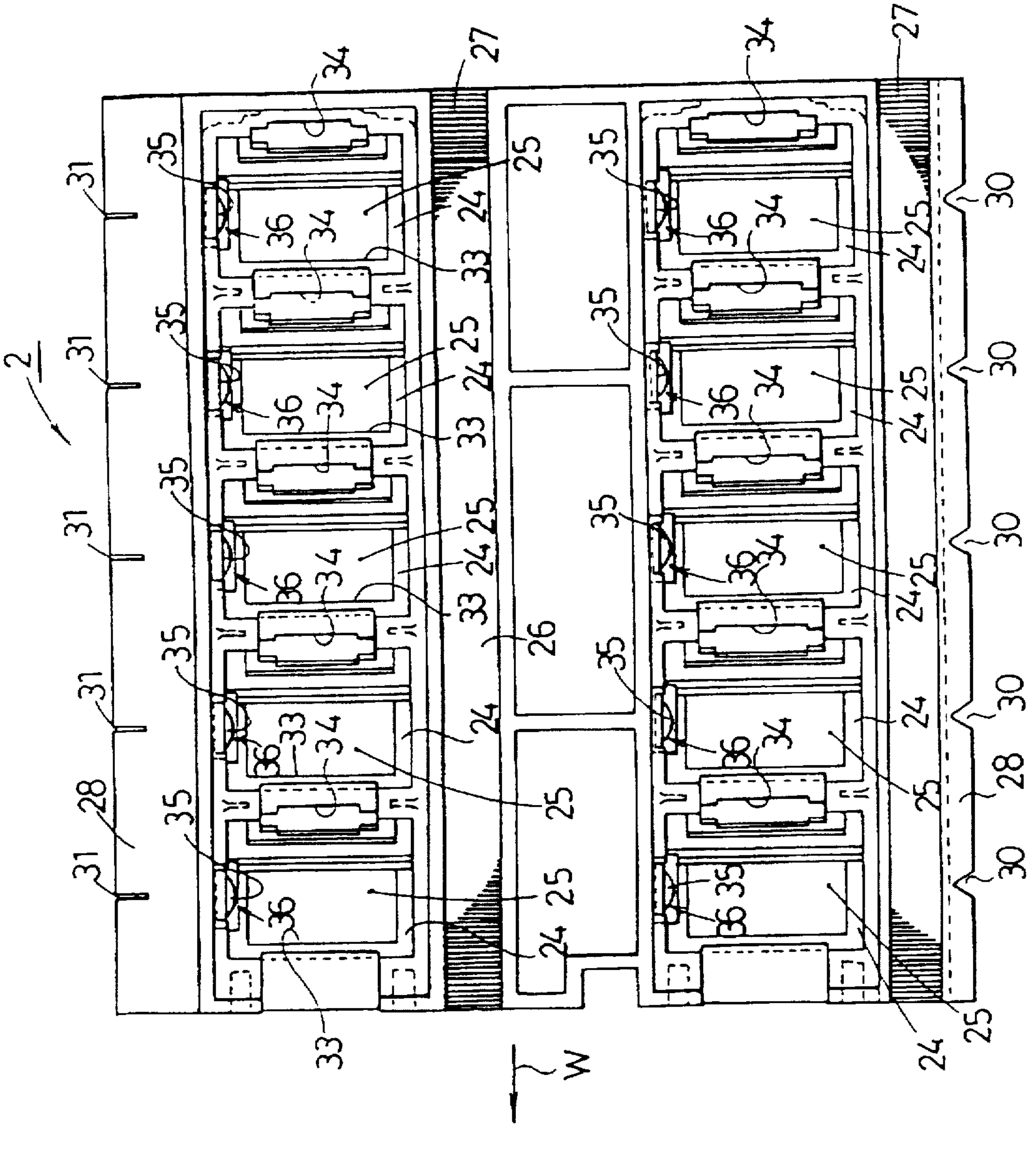
FIG. 3 is a plan view of a cartridge case.
Figure 4:
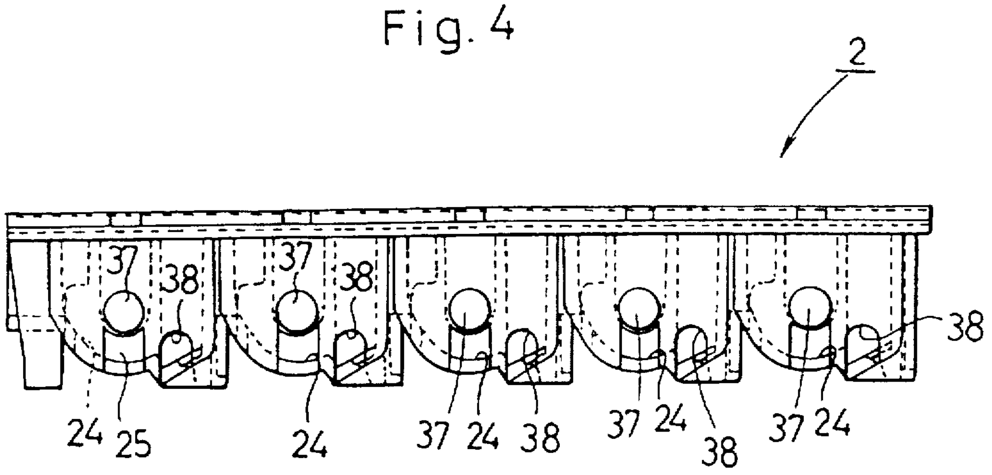
FIG. 4 is a side view of the cartridge case.
Figure 5:
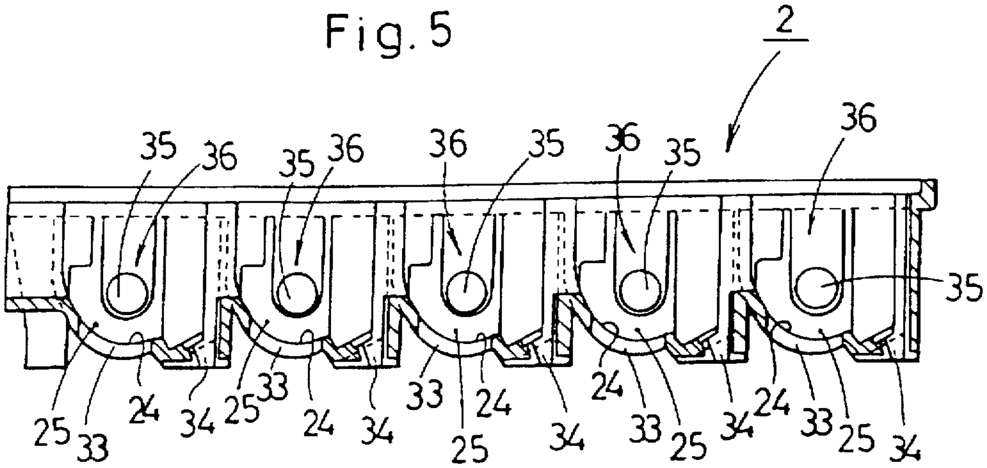
FIG. 5 is a longitudinal cross sectional view of the cartridge case.
Figure 6:
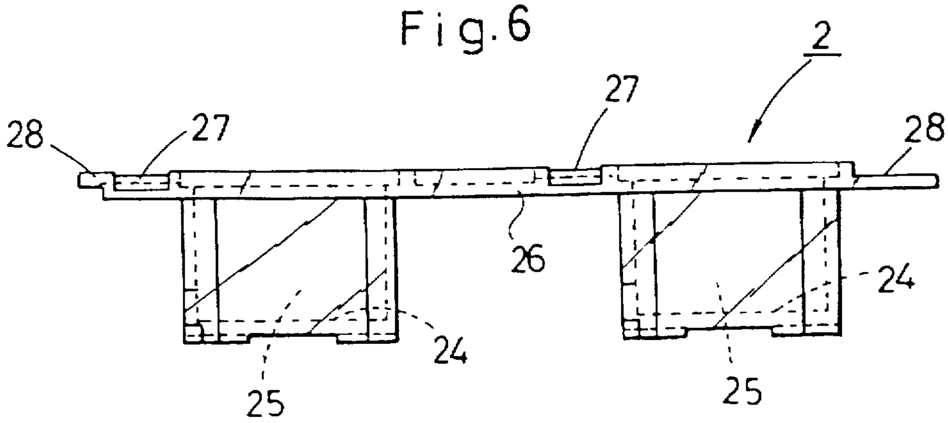
FIG. 6 is a front view of the cartridge case.

The film cartridge 3 to be held in the cartridge case 2 includes, as shown in FIG. 2, a casing 15 consisting of two separated synthetic resin members, a spool 16 rotatably mounted in the casing 15, and a cover 18 for closing a film outlet 17 to shield the interior of casing 15 from external light. The cover 18 is actuated for opening and closing operations by a pivotal (operating) shaft 19 which is mounted through a side wall of the casing 15 to be driven by an opening and closing mechanism (not shown). When the cover 18 is opened, the spool 16 is rotated with one (operating) end 20 engaged across the side wall of the casing 15 and driven by a rotating mechanism (not shown) for loading and unloading the film 5.

The casing 15 of the cartridge 3 has an ID bearing region 23 on the outer surface thereof for indicating an identification number of the cartridge 3. Also, a display window 22 is provided in the side wall of the casing 15 where the operating end 20 of the spool 16 is exposed for displaying either an unused or a used condition of the cartridge 3, a state of development, the presence or absence of available frames, etc.

The cartridge case 2 for holding a group of the film cartridges 3 is illustrated in more detail in FIGS. 3 to 6.

The cartridge case 2 holds and carries the film cartridges 3 from the unloading station 4 to the loading station 13 and comprises a pair of left and right 5-cartridge containers 25 joined to each other by a link plate 26, each container 25 having five bottoms 24 arranged to hold five cartridges 3 of FIG. 2 in a respective row aligned with the moving direction W.

A rack or conveyor element 27 for engagement with a cartridge case conveying means described later (not shown in FIGS. 3 to 6) is provided on one side of each of the two, left and right, cartridge containers 25.

Also, respective flanges 28 are provided on outer sides of respective cartridge containers 25, extending in the moving direction W of the cartridge case 2. One of the two flanges 28 on the left of the moving direction W of the cartridge case 2 (as viewed in the drawings) has a plurality of V-shaped (positioning) notches 30 provided in an outer edge thereof for positioning the cartridge case 2 in relation to each cartridge container 25. The other flange 28 has a plurality of slit detection elements 31 provided in an outer edge thereof indicative of the cartridge case 2 being positioned in relation to the cartridge container 25.

Each of the bottoms 24 of the cartridge containers 25, which are aligned in two rows between the flanges 28 and at a level lower than the conveyor elements 27, has a readout window 33 for viewing the ID bearing region 23 of the film cartridge 3 held in the container 25 and a through aperture 34 for passing the film sheet 5 unloaded from or loaded into its cartridge 3 through the film outlet 17. Also, the bottom 24 of the cartridge container 25 is provided at one side with a vertically extending holddown means 36 for pressing down with a lower semicircular portion 35 thereof the casing 15 of the film cartridge 3, thus to hold the cartridge 3 at a specific position, and at the other side with a spool actuating hole 37 through which the operating end 20 of the spool 16 in the cartridge 3 is engaged with and actuated by the rotating mechanism for loading and unloading the film 5 and a cover actuating hole 38 through which the pivotal shaft 19 of the cover 18 is actuated by the not shown mechanism for opening and closing the film outlet 17 of the cartridge 3.

Figure 7:
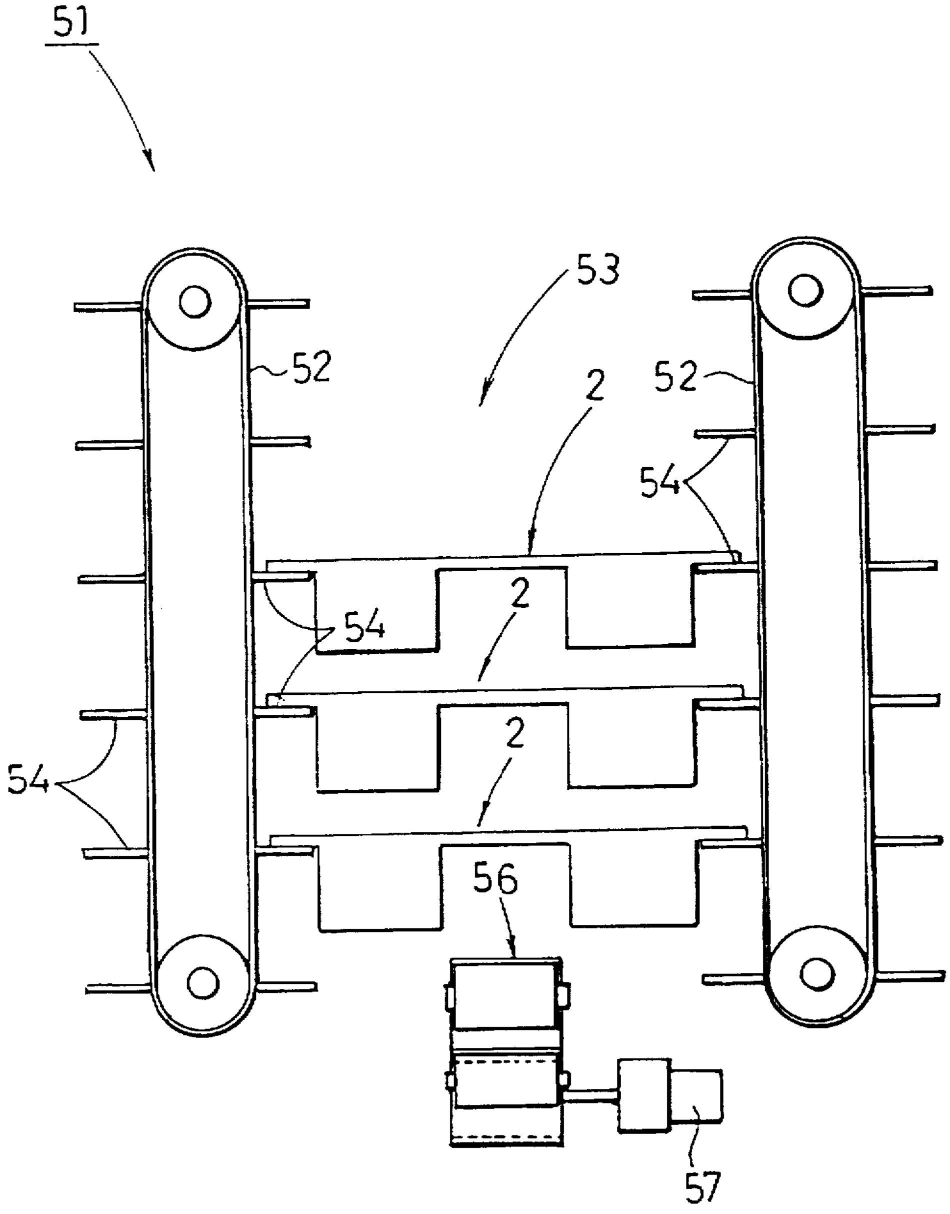
FIG. 7 is a schematic front view of a stocker system holding cartridge cases.
Figure 8:
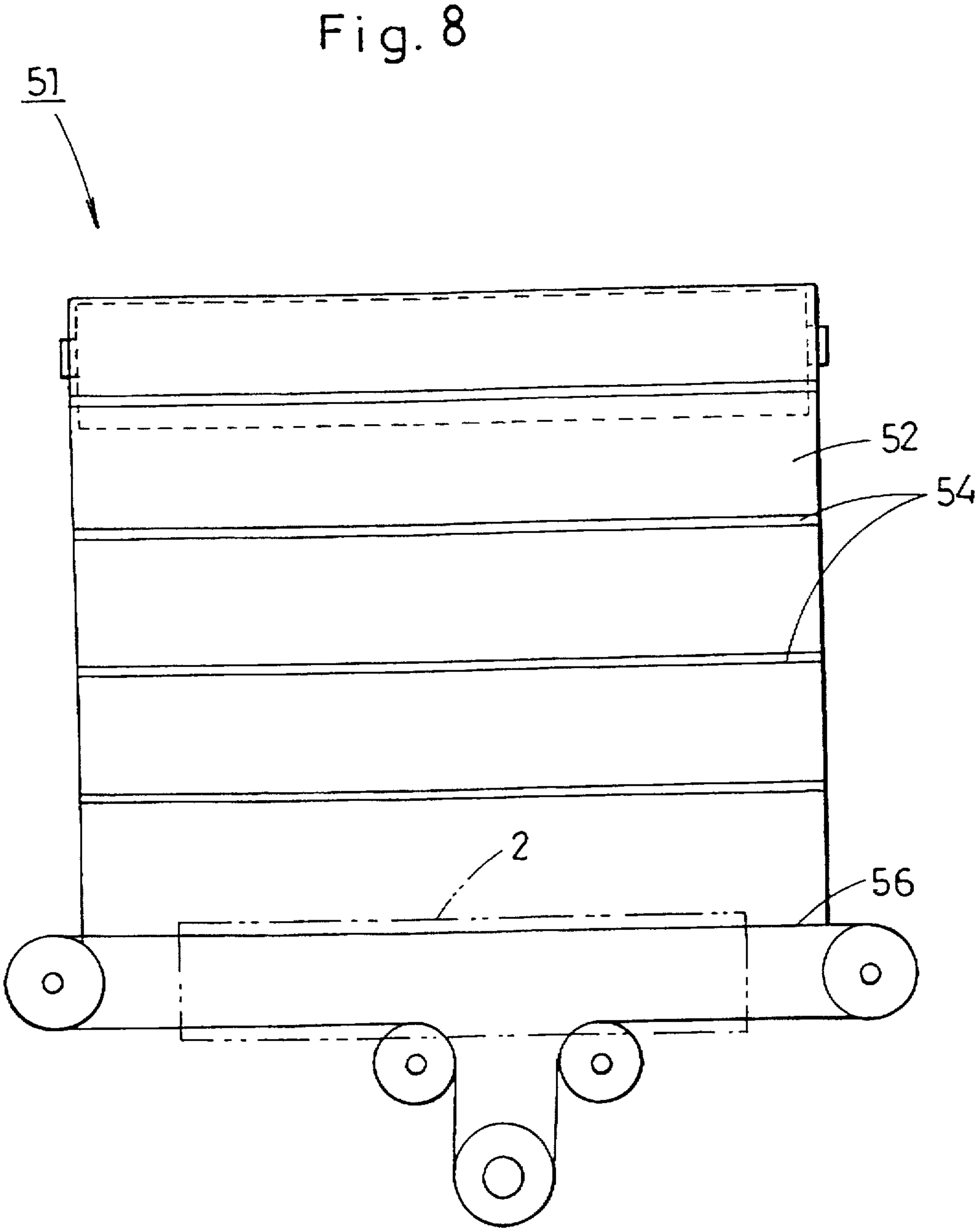
FIG. 8 is a schematic side view of the stocker system for the cartridge cases.

A stocker device 51 is located on the film feeder system 40 for storing and feeding the cartridges 2 one by one. As shown in FIGS. 7 and 8, the stocker device 51 includes a pair of endless belts 52 arranged opposite to each other so as to have a space 53 for storing the cartridge cases 2 and driven for loop movement by a drive device (not shown) or a motor controlled synchronous with the processing speed of the automatic film development processor apparatus 1. The endless belts 52 have a plurality of corresponding support plates 54 mounted thereto at substantially equal intervals, such that pairs of plates 54 of belts 52 support a given respective cartridge case 2. More particularly, any two corresponding support plates 54 engage with and hold from opposite sides or respective flanges 28 of the cartridge case 2.

When the stocker device 51 is driven in forward and backward directions by the not shown drive device, the support plates 54 of endless belts 52 lift up and down the cartridge cases 2 thereon.

Provided beneath and between the two opposite endless belts 52 is a cartridge case conveying means 12 which comprises a conveyor belt 56 arranged extending between the unloading station 4 and the loading station 13 for conveying the cartridge cases 2 in succession from the unloading station 4 to the loading station 13 by engaging with link plates 26 thereof, and a motor 57 for driving the conveyor belt 56.

Figure 9:
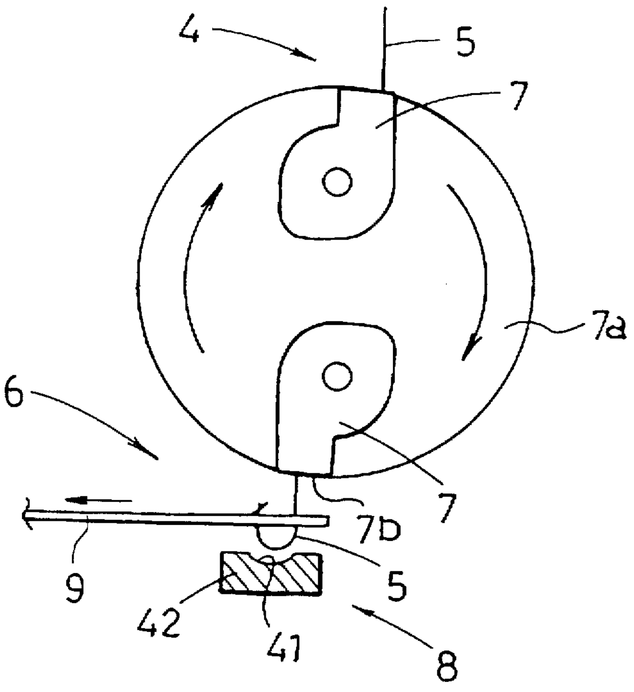
FIG. 9 is a schematic side view of a splicer device.
Figure 10:
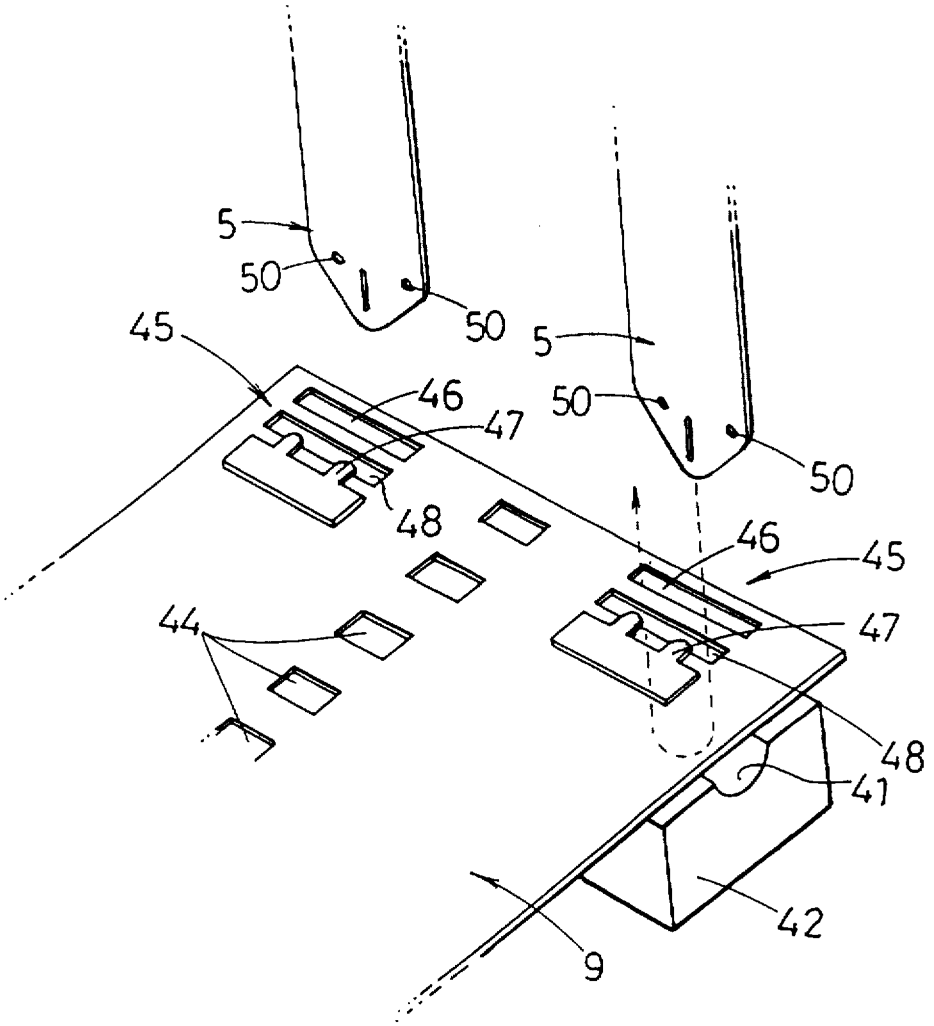
FIG. 10 is a perspective view of the splicer device.

The splicer unit 8 is provided for joining the exposed end of the undeveloped film sheet 5 shifted from the film cartridge 3 to the takeup cartridge 7 with the short leader 9 and includes, as shown in FIGS. 9 and 10, a guide member 42 having an U-shaped reflector recess 41 provided in the upper surface thereof so that it faces a film output **7*b* of the takeup cartridge 7 when the upside-down magazine 7*a* is turned 180 degrees from the unloading station 4. The short leader 9 is supplied from leader storage 43 to between the guide member 42 and the film outlet 7*b* of the takeup cartridge 7**.

The short leader 9 has a row of transfer apertures 44 provided in the center thereof and two joining elements 45 arranged on opposite, left and right, rear end regions thereof.

The joining element 45 comprises a film insertion hole 46 and a stopper hole 48, provided in front of the film insertion hole 46, and into which a stopper strip 47 projects. The stopper strip 47 is arranged for engagement with two through holes 50 provided in the distal end of the film sheet 5.

The cartridge case conveying means 12 for conveying the cartridge cases 2 filled with the film unloaded film cartridges 3 from the feeder system 40 to the loading station 13 includes conveyor belt 56 which runs from the unloading station 4 to the loading station 13. As the conveyor belt 56 performs a loop or endless movement, its comes into engagement with the link plate 26 of each cartridge case 2 and conveys it from the feeder system 40 to the loading station 13.

For starting the operation of the automatic film development processor machine, a desired number of the film cartridges 3 loaded with undeveloped films 5 are installed by an operator in the cartridge containers 25 of each cartridge case 2.

When rows of the film cartridges 3 are correctly placed in the cartridge containers 25 of the cartridge case 2 and secured with the respective holddown portions 35, the operating end 20 of each spool 16 is aligned with the spool actuating hole 37 of the cartridge container 25, the film outlet 17 with the through aperture 34, and the pivotal shaft 19 of each cover 18 with the cover actuating hole 38. Simultaneously, the ID bearing region 23 of each cartridge 3 is located and viewed through the respective readout window 33.

The film cartridges 3 in the cartridge case 2 are delivered in succession by a not unshown transfer mechanism to the rewinding station 6 where an undeveloped film sheet 5 is transferred from its film cartridge 3 to the takeup cartridge 7.

While the cartridge case 2 is positioned in the unloading station 4, the V-shaped notches 30 of one flange 28 come into engagement with correspondingly shaped projections, not shown, provided at the rewinding station 6, and slit detection elements 31 of the other flange 28 are detected. In response to the detection of the slit detection elements 31, the cover 18 of the film outlet 17 of the cartridge 3 is opened by the cover actuating mechanism coupling across the through hole 38 and turning the pivotal shaft 19. Also, the spool 16 is rotated as its operating end 20 is engaged through the spool actuating hole 37 with the spool actuating mechanism so that the undeveloped film sheet 5 is unloaded from its cartridge 3.

The undeveloped film sheet 5 is then rewound into the takeup cartridge 7 when its trailing end has been detached from the spool 16 of the cartridge 3 by an automatic detaching device not shown. During such rewinding, the ID bearing region 23 of the cartridge 3 is read and recorded on a controller (not shown) and the trailing end of the undeveloped film sheet 5 by a recording means such as a magnetic head.

When the undeveloped film sheet 5 unloaded from the cartridge 3 has been rewound, the V-shaped notches 30 of the cartridge case 2 are disengaged from the corresponding projections. This is followed by advancing the cartridge case 2 one step to unload and rewind an undeveloped film sheet 5 of the succeeding film cartridge 3. The undeveloped film sheets 5 of all the film cartridges 3 in the cartridge case 2 are unloaded and rewound in a succession by repeating the above procedure.

When the film cartridges 3 carry no undeveloped films, the link plate 26 of the cartridge case 2 is placed on the conveyor belt 56 of the cartridge conveying means 12.

The cartridge case 2 having the film unloaded cartridges 3 are conveyed by the loop or endless movement of the conveyor belt 56 from the unloading station 4 towards the loading station 13, and the succeeding cartridge case 2 carrying another group of film cartridges 3 loaded with undeveloped film sheets 5 is delivered by the operation of the endless belts 52 to the unloading station 4. The undeveloped film sheets 5 in their respective cartridges 3 on the succeeding cartridge case 2 are then unloaded and rewound into corresponding takeup cartridges 7 in succession.

The undeveloped film sheet 5 rewound in the takeup cartridge 7 is inverted as the upside-down magazine 7a turns 180 degrees. As the result, the film output 7b of the takeup cartridge 7 comes to be positioned just above the U-shaped deflector recess 41 and simultaneously, the short leader 9 is delivered from the leader storage unit 43 so that its joining element 45 is positioned between the film outlet 17b of the takeup cartridge 7 and the U-shaped deflector recess 41.

The distal or trailing end of the undeveloped film sheet 5 released from the takeup cartridge 7 is passed through the film insertion hole 46, deflected along the U-shaped deflector recess 41, and moved into the stopper hole 48. In the stopper hole 48, the through holes 50 of the undeveloped film sheet 5 are engaged with the stopper strip 47 so that the film sheet 5 is joined with the short leader 9.

More particularly, the short leader 9 is connected at its joining elements 45 with two undeveloped film sheets 5 in the illustrated embodiment and transferred by a is transferring means including a sprocket engaged with transfer apertures 44. This allows the undeveloped film sheets 5 unloaded from their respective takeup cartridges 7 to be subjected to a series of development, bleaching, fixing, drying, and other relevant processes before being separated from the short leader 9 in the separator unit 11. The short leaders 9 separated from the developed film sheets 5 are then collected in leader receiver unit 14.

The cartridge case 2 at the loading station 13 is secured in position with the V-shaped notches 30 of its flange 28 engaged with corresponding projections, not shown, in a manner substantially equal to the manner at the unloading station 4. Upon the slit detection elements 31 of the other flange 28 of the cartridge case 2 being detected, the pivotal shaft 19 of the cover 18 of each film cartridge 3 is linked across the through hole 38 and actuated by the cover actuating mechanism for opening the film outlet 17.

The developed film sheet 5 separated from the short leader 9 is identified by reading and comparing its ID record with the ID data of the ID bearing region 23 on the film cartridge 3, and an end thereof (i.e. the trailing end of the undeveloped film) is loaded back through the film outlet 17 onto the spool 16 of the film cartridge 3.

The operating end 20 of the spool 16 is then linked across the spool actuating hole 37 and rotated by the spool actuating mechanism for taking up the developed film sheet 5 in its cartridge 3.

When all the film cartridges 3 in the cartridge case 2 have been loaded again with their respective developed film sheets 5, V-shaped notches 30 are disengaged from the corresponding projections. The cartridge case 2 may simply be removed or stored in a similar stocker device, not shown, installed at the loading station 13 until a desired number of the cartridge cases 2 are reclaimed.

What is claimed is:

1. An automatic film development apparatus comprising:
   - a plurality of cartridge cases, each for carrying a plurality of film cartridges loaded with respective sheets of undeveloped film;
   - an unloading station;
   - a feeder unit for storing said plurality of cartridge cases and for delivering them one by one to said unloading station, at which undeveloped film sheets may be unwound from respective cartridges carried in a respective said cartridge case at said unloading station;
   - a rewinding station for rewinding a thus unwound undeveloped film sheet into a takeup cartridge;
   - a development unit;
   - a film leader supply unit;
   - a splicer unit for joining an end of the undeveloped film sheet from said takeup cartridge to a film leader supplied from said film leader supply unit, whereby the undeveloped film sheet joined to the film leader may be developed in the development unit to form a developed film sheet;

a separator unit for separating the developed film sheet from the film leader;

a leader receiving unit for collecting film leaders separated from respective developed film sheets;

a loading station; and conveying means, extending from said unloading station to said loading station, for conveying said respective cartridge case containing cartridges emptied of undeveloped film sheets from said unloading station to said loading station, whereat the developed film sheets may be loaded back into respective cartridges contained in said cartridge case at said loading station.

2. An apparatus as claimed in claim 1, wherein said splicer unit is operable to join two undeveloped film sheets to the film leader.

3. An apparatus as claimed in claim 1, wherein each said cartridge case has holding means to position respective film cartridges carried therein, through apertures for passage of film sheets being unloaded from and loaded to the respective film cartridges, and positioning elements for positioning said each cartridge case.

4. An apparatus as claimed in claim 1, wherein each said cartridge case includes a plurality of containers for carrying respective film cartridges.

5. An apparatus as claimed in claim 4, wherein said containers are arranged in at least one row.

6. An apparatus as claimed in claim 5, wherein said containers are arranged in two parallel rows.

7. An apparatus as claimed in claim 6, wherein said cartridge case further includes conveyor elements for engagement with a conveyor device.

8. An apparatus as claimed in claim 6, wherein said cartridge case further includes opposite side flanges.

9. An apparatus as claimed in claim 8, further comprising positioning elements in one said flange, and detection elements in the other said flange.

10. An apparatus as claimed in claim 6, wherein said cartridge case further includes a plate connecting said two rows of said containers and supported on said conveying means.

11. An apparatus as claimed in claim 5, wherein said cartridge case further includes a conveyor element for engagement with a conveyor device.

12. An apparatus as claimed in claim 5, wherein said cartridge case further includes opposite side flanges.

13. An apparatus as claimed in claim 12, further comprising positioning elements in one said flange, and detection elements in the other said flange.

14. An apparatus as claimed in claim 4, wherein said cartridge case further includes, for each said container, holding means to position a respective film cartridge, a through aperture for passage of a film sheet being unloaded from and loaded to the respective film cartridge, and a positioning element for positioning said cartridge case relative to the respective film cartridge.

15. An apparatus as claimed in claim 1, wherein said conveying means comprises and endless conveyor.

* * * * *